(12) United States Patent
Nicolini et al.

(10) Patent No.: US 8,615,482 B1
(45) Date of Patent: Dec. 24, 2013

(54) METHOD AND APPARATUS FOR IMPROVING THE UTILIZATION OF SNAPSHOTS OF SERVER DATA STORAGE VOLUMES

(75) Inventors: Mark J. Nicolini, Orlando, FL (US); Suren Sethumadhavan, Lake Mary, FL (US)

(73) Assignee: Symantec Operating Corporation, Mountain View, CA (US)

( * ) Notice: Subject to any disclaimer, the term of this patent is extended or adjusted under 35 U.S.C. 154(b) by 2024 days.

(21) Appl. No.: 11/156,781

(22) Filed: Jun. 20, 2005

(51) Int. Cl.
*G06F 11/00* (2006.01)
(52) U.S. Cl.
USPC .......... 707/204; 714/6; 714/15; 714/20; 707/202; 711/170
(58) Field of Classification Search
USPC .......................................................... 707/204
See application file for complete search history.

(56) References Cited

U.S. PATENT DOCUMENTS

| | | | | |
|---|---|---|---|---|
| 6,708,227 B1* | 3/2004 | Cabrera et al. | ................ | 719/328 |
| 6,839,819 B2* | 1/2005 | Martin | ................ | 711/162 |
| 6,857,059 B2* | 2/2005 | Karpoff et al. | ................ | 711/209 |
| 6,981,114 B1* | 12/2005 | Wu et al. | ................ | 711/162 |
| 7,287,045 B2* | 10/2007 | Saika et al. | ................ | 1/1 |
| 2004/0148376 A1* | 7/2004 | Rangan et al. | ................ | 709/223 |
| 2006/0020858 A1* | 1/2006 | Schaefer | ................ | 714/38 |
| 2006/0149792 A1* | 7/2006 | Yamagami | ................ | 707/202 |
| 2007/0294321 A1* | 12/2007 | Midgley et al. | ................ | 707/204 |

* cited by examiner

*Primary Examiner* — Shyue Jiunn Hwa
(74) *Attorney, Agent, or Firm* — Campbell Stephenson LLP

(57) ABSTRACT

A method and apparatus for creating and using a snapshot in data backup and/or other data services. The method creates snapshot(s) of volume(s) using a select set of Snapshot Providers, transports the snapshots to a server for processing and processes the snapshots. Processing may include creating a backup, data mining the snapshot, and the like.

7 Claims, 3 Drawing Sheets

100

200

200

METHOD AND APPARATUS FOR IMPROVING THE UTILIZATION OF SNAPSHOTS OF SERVER DATA STORAGE VOLUMES

BACKGROUND OF THE INVENTION

1. Field of the Invention

Embodiments of the present invention generally relate to a method and apparatus for utilizing data within storage volumes and, more particularly, the invention relates to a method and apparatus for creating a storage volume snapshot in a process for backing up or otherwise utilizing data within the storage volume.

2. Description of the Related Art

In a common networked computing environment, at least one application server is coupled to user computers (clients) through a communications network. The clients execute and utilize various applications available on the application server. The application server contains or has access to data for the applications it supports. The data is generally stored in a multitude of volumes of a storage system that is coupled to the application server.

The manufacturers of the various application software packages provide supplemental software that can be executed for making copies of the data that is stored in each volume that is used by a particular application. The supplemental software (referred to herein as a Snapshot Provider) creates a "snapshot" of the data volume used by the related application. A snapshot is generally defined as a metadata mapping to volume blocks that represent the "picture" of the data at the time the snapshot is created. For example, Microsoft Corporation distributes a software package entitled "Volume Shadow Copy Services" (VSS) that provides a process for creating a snapshot (or shadow copy) of a volume that is used by a Microsoft application (e.g., EXCHANGE). VSS exposes APIs in a VSS framework that enable vendors to VSS-enable their solutions. Typically, a provider is a process (i.e., Kernel-mode or user-mode code) that "persists" data about a physical snapshot in order for that snapshot to be exposed to the operating system and/or applications. Providers can be implemented in either hardware or software. Once created, the snapshot is processed within the application server to provide a data stream to a backup system such that the data files within the volume are backed up on a remotely located backup system.

A Snapshot Provider is used for creating each of the snapshots. These providers are generally individually associated with one or more volumes and, there may be many Snapshot Providers located in one application server. It is also possible that a volume can associated with one or more different providers. The proliferation of Snapshot Providers can become detrimental to the function of the application server. The processing of the snapshots on the application server by different providers places a severe burden on the application server.

Therefore, there is a need in the art for a method and apparatus of improving the use of snapshots in data backup as well as other data services.

SUMMARY OF THE INVENTION

The present invention is a method and apparatus for creating and using a snapshot for data backup or other data services. The invention queries the framework in which the Snapshot Providers operate (e.g., the VSS framework) for Snapshot Providers and Application Writers that reside on an application server. This information generally contains the location, i.e., the volume(s) that are used for storage of the application data, and the Snapshot Provider that is used to create snapshots for the particular volume(s). The invention processes the information and ensures that a snapshot is only created for unique volumes. Thereafter, the invention determines the optimal Snapshot Providers to use for each volume when creating the snapshot. The intent is to use the optimal Provider for each volume being snapped so that an optimized set of Providers are used to snap all of the volumes. Each Snapshot Provider that is selected creates a snapshot of the volume(s) related to that Provider. The snapshots are then sent to a media server that is remote from the application server. The media server uses the snapshot to either create a backup or to provide other data services. For example, the snapshot could be processed to create backup volumes that are then stored on backup storage media such as a tape drive. Alternatively, the snapshot may be remotely processed to provide data mining services to identify and utilize certain information stored within the volumes. In either instance, the processing burden is removed from the application server and transferred to the media server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
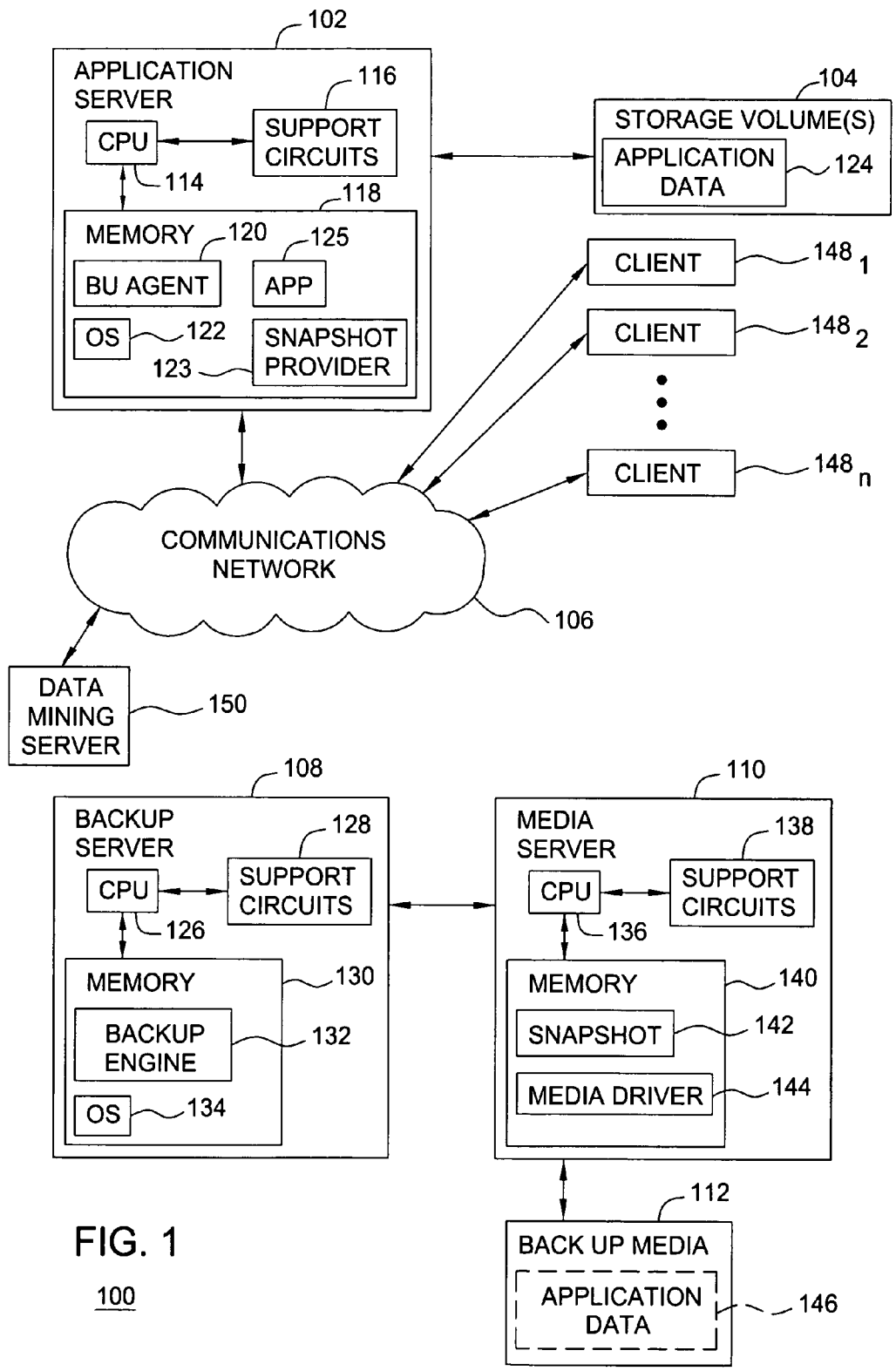
FIG. 1 depicts a block diagram of a computer network that utilizes the present invention.

FIG. 1 depicts a computer network 100 comprising an application server 102, at least one storage volume 104, a network 106, a backup server 108, a media server 110, and backup media 112. In this embodiment of the invention, it is assumed that the snapshot that is created of the storage volumes 104 coupled to the application server 102 shall be used to create a backup of that data. However, the invention is not limited to creating backups. The invention may also be used to enable the snapshot of the storage volumes to be searched and accessed in a data mining process. Other data services may also be provided once the snapshot is transported and made available remotely.

The application server 102 comprises a central processing unit 114, support circuits 116 and memory 118. The CPU 114 may be one or more of a conventional microprocessor or microcontroller. The support circuits 116 comprise well known circuits that are used to facilitate functionality of the CPU 114. Such support circuits 116 include clock circuits, cache, power supplies, input/output circuits, and the like. The memory 118 may comprise random access memory, read only memory, removable storage, optical disk storage, disk drive storage, and combinations thereof. The memory 118 stores a backup agent 120, Snapshot Provider 123, application software 125 and an operating system 122. Although the Snapshot Provider 123 is depicted as being implemented in software, those skilled in the art will realize that Snapshot Providers can also be implemented in hardware. Either hardware or software implementations will function in connection with the present invention.

The application server 102 is coupled to storage volume(s) 104 that store the application data 124. The storage volumes may be one or more disk drives, optical drives or other random access memory storage. The application data stored on the various volumes may be created by each application software 125 and stored in memory 118. The applications 125 generally utilize a number of volumes, where multiple applications may store data into a single shared volume. In operation, the operating system 122 is executed by the CPU 114 to control the general utilization and functionality of the application server 102.

Application software 125 is executed by the CPU 114 to provide application services to various users that may be connected to the network 106. The users are shown as clients 148₁, 148₂ . . . 148$_N$. The users access the application server 102 through the network 106. The backup agent 120 and the Snapshot Providers 123 are described more fully with respect to FIG. 2 below. Suffice it to say that there is a plurality of Snapshot Providers 123 (e.g., VSS Providers) that are available to the applications 125. The backup agent 120 is utilized to select a minimum number of Snapshot Providers to execute and create snapshots for each of the volumes used by the applications. The invention is utilized to ensure that redundant volumes are not created as snapshots such that volumes that are shared by particular applications are uniquely copied. This invention also ensures that the Provider being utilized supports transportability of the volume from the application sever to the backup server; if required.

The backup server 108 comprises a central processing unit (CPU) 126, support circuits 128 and memory 130. As with the application server 102, the backup server 108 has one or more CPUs 126 that are well known microprocessors or microcontrollers. The support circuits 128 are utilized to facilitate operation of the CPU and include such circuits as clock circuits, input/output circuits, cache, power supplies, and the like. The memory 130 may comprise random access memory, read only memory, disk drives, optical drives, removable storage, and any combination thereof. The memory 130 stores backup software that, when executed, operates as a backup engine 132 and an operating system (OS) 134 for the backup server 108.

The backup server 108 is coupled to a media server 110. The media server 110 provides services to the backup server 108 for storage of the backup data to backup media 112. In some instances, the backup server 108 and the media server 110 may be merged into a single server that is coupled directly to the backup media 112. In other situations, the backup server 108 may be coupled to a plurality of media servers 110 such that a number of backup processes may be simultaneously operating.

The media server 110 comprises a CPU 136, support circuits 138 and memory 140. As discussed with the other servers, the CPU 136 may be one or more well known microprocessors or microcontrollers. The support circuits 138 are well known support circuits for facilitating the operation of the CPU 136 and include such circuits as input/output circuits, cache, power supplies, clock circuits, and the like. The memory 140 may comprise random access memory, read only memory, disk drives, optical drives, removable storage, and any combination thereof. The memory 140 stores the snapshot that is created by the Snapshot Provider 123. The snapshot is transported through the network 106 to the backup server 108 and passed to the media server 110 for storage and/or processing. The media server 110 also contains a media driver 144 that is used for writing the data within the snapshot 142 to the backup media 112. As such, application data 146 is ultimately stored in the backup media 112 typically in a serial format such as Microsoft Tape Format (MTF).

Figure 2A:
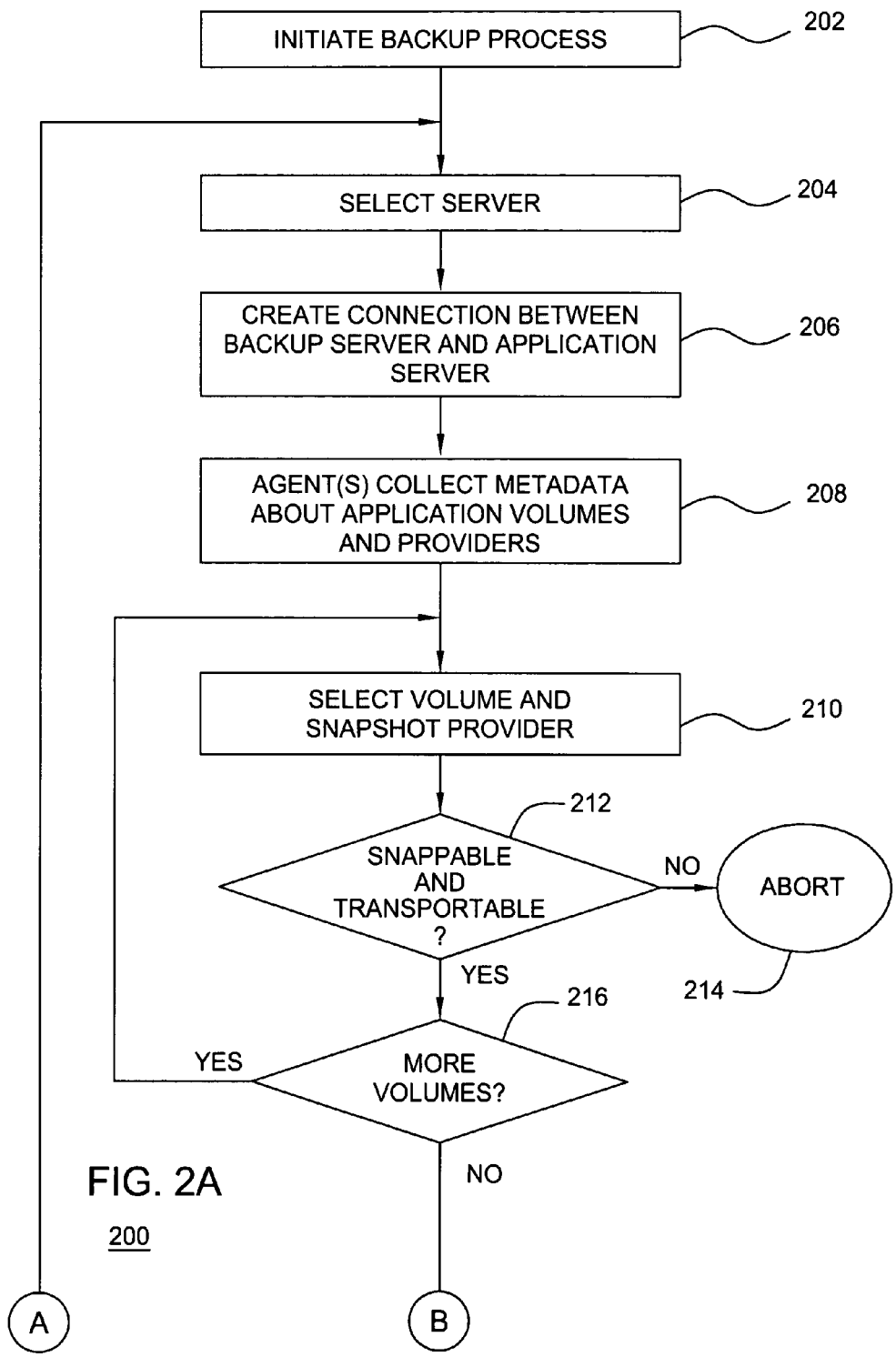
FIGS. 2A and 2B depict a flow diagram of a method of creating and utilizing snapshots within the computer network of FIG. 1.
Figure 2B:
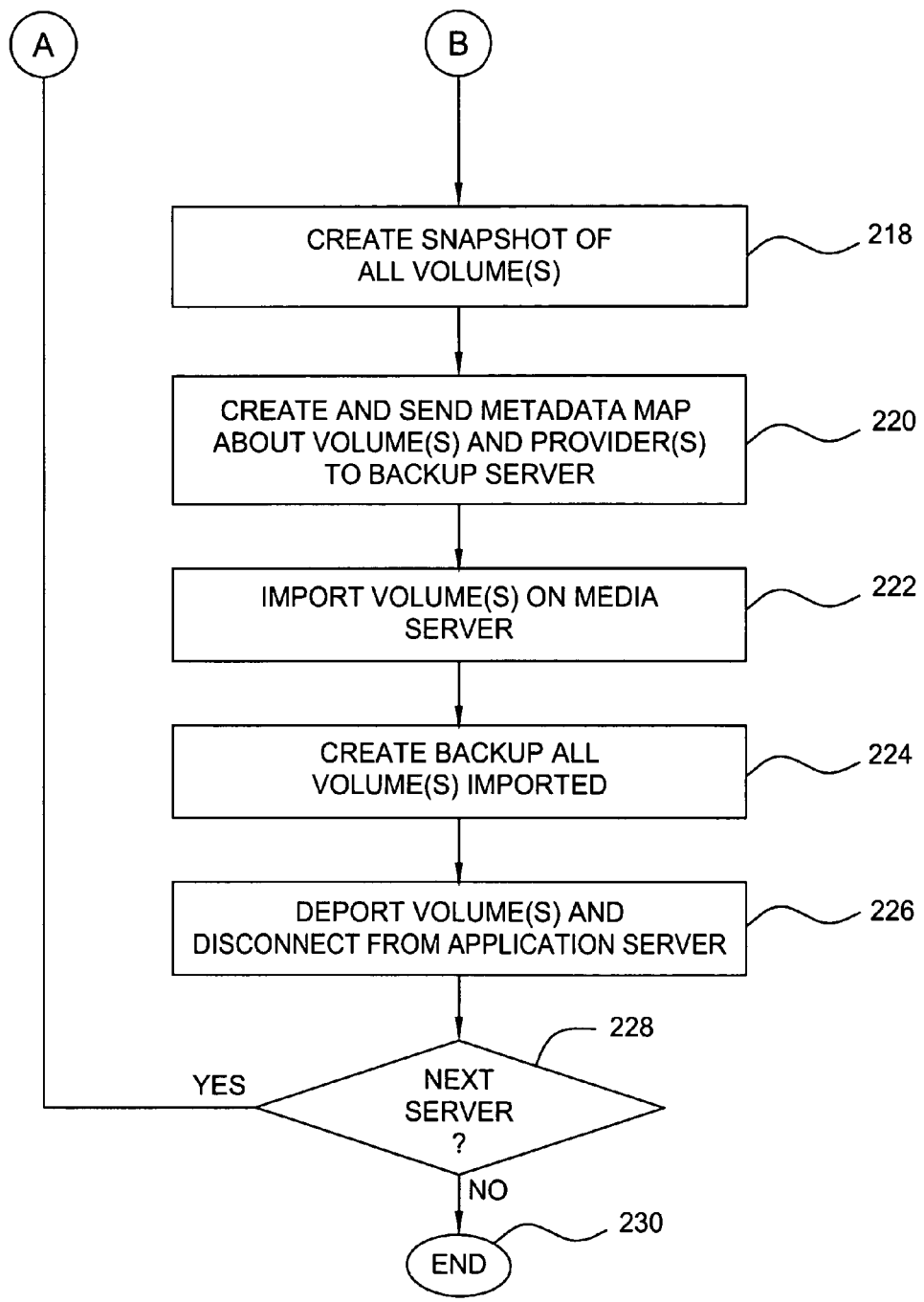

FIGS. 2A and 2B together depict a flow diagram of a method 200 of creating a snapshot of the application data 124 within the storage volume(s) 104, transporting that snapshot to the media server 110 as snapshot 142 and then converting the snapshot 142 into application data 146 for storage on the backup media 112. The method 200 begins by initiating the backup process at step 202. At step 204, an application server 102 is selected by the backup server 108. There may be a multitude of application servers coupled to the network 106 and, as such, one of those servers will be selected by the backup server 108 for backup processing. Once the application server is selected, at step 204, the backup server creates a communication channel between the backup server 108 and the selected application server 102 (step 206).

At step 208, the backup engine 132 requests the agent 120 to collect metadata regarding the volume(s) used by the applications being backed up. The invention builds a unique list of volumes based on the list of volumes returned by the agent 120. The agent 120 collects metadata regarding the Providers available within, for example, the VSS framework, for each unique volume in the previously created volume list. The Provider list is optimized by identifying a common Provider that supports all of the volumes. If a common Provider cannot be identified, then the Provider list is optimized to include the minimal set of Providers that supports all of the volumes.

At step 210, the snapability and transportability of each volume in the volume list is determined by a subsequent query of the Provider associated with the volume. Some forms of Snapshot Providers do not create snapshots that can be removed from the volume or disk drives within the application server 102 and remain useful. The backup engine 132 knows which Snapshot Providers create non-transportable snapshots and thus will abort snapping any volume that can only be copied with that form of Snapshot Provider. If the selected volume is transportable, the method 200 proceeds to step 216. If more volumes are to be processed, the method 200 returns to step 210, until all volumes have been verified for snapability and transportability.

At step 218, the method creates a snapshot of a selected volume using the Snapshot Provider(s) selected. At step 220, a metadata mapping document of volumes, Providers, and snapshot IDs is generated on the application server for use on the backup server. This document is used on the backup server to preserve the volume to snapped volume association as well as the association with the Provider used to create the snapshot. At step 220, the metadata document is sent to the backup server. At step 222, the snapshot(s) are transported (sent) from the application server 102 using the backup agent 120 through the network 106 to the backup server 108. The backup server 108 imports the snapshot(s) into the namespace of the media server 110. At this point, all process loading of the application server 102 is complete and further processing of the snapshot is performed on the media server 102.

At step 224, the media server processes the snapshot to create backup volumes of application data to be stored within the backup media 112. Generally, this is a process that converts the snapshot data into a serial data stream that would be stored in Microsoft Tape Format (MTF) on a tape drive. However, in many instances, a tape drive is not used, and a disk drive is used as a virtual tape drive for storing the MTF data.

The application server 102 may "clean up" by deleting the snapshot that was exported. At step 226, the backup server 108 deports the volumes and disconnects the communication channel from the application server 102.

At step 228, the method queries whether another server is to be backed up. If another server is to be backed up, the method proceeds to step 204 to select a new server. If a new server is not to be processed, the method 200 ends at step 230.

The foregoing embodiment of the invention transported the snapshot to the media server for backup. In an alternative embodiment, the snapshot may be transported to a server that processes the snapshot for purposes other than backup. For example, a data mining server (150 in FIG. 1) may receive transported snapshots to search for specific information stored on many volumes. The snapshots could also be simultaneously used for backup and other processes.

While the foregoing is directed to embodiments of the present invention, other and further embodiments of the invention may be devised without departing from the basic scope thereof, and the scope thereof is determined by the claims that follow.

The invention claimed is:

1. A method comprising:
   identifying a plurality of volumes, in response to receiving a request to backup a plurality of applications, wherein the identifying the plurality of volumes comprises identifying which volumes are used by the plurality of applications to be backed up;
   identifying a minimal set of snapshot providers from a plurality of snapshot providers, wherein the identifying the minimal set comprises identifying which of the plurality of snapshot providers support the identified plurality of volumes
   identifying whether a particular snapshot provider of the minimal set of snapshot providers can create a transportable snapshot;
   when the particular provider of the minimal set of snapshot providers cannot create a transportable snapshot, aborting the method;
   when the particular provider of the minimal set of snapshot providers can create a transportable snapshot, causing the minimal set of snapshot providers to create a plurality of snapshots, wherein each of the snapshots is a snapshot of a respective one of the plurality of volumes;
   causing the plurality of snapshots to be transported to a media server, wherein the media server is configured to perform the backup of the plurality of the applications using the plurality of snapshots, and wherein the identifying the plurality of volumes, the identifying the minimal set of snapshot providers, the causing the minimal set, and the causing the plurality of snapshots are performed by a computing device configured as a backup server; and
   data mining the plurality of snapshots for specific information.

2. A computer network comprising:
   a computing device configured as a backup server;
   a media server; and
   a network coupling the backup server to the media server;
   the backup server being coupled to a plurality of volumes for storing data,
       wherein the backup server is configured to identify a plurality of volumes, in response to receiving a request to backup a plurality of applications, wherein identifying the plurality of volumes comprises identifying which volumes are used by the plurality of applications to be backed up;
       wherein the backup server is configured to identify a minimal set of snapshot providers from a plurality of snapshot providers, wherein identifying the minimal set comprises identifying which of the plurality of snapshot providers support the identified plurality of volumes;
       wherein the backup server is configured to identify whether a particular snapshot provider of the minimal set of snapshot providers can create a transportable snapshot;
       wherein the backup server is configured to abort the method when the particular provider of the minimal set of snapshot providers cannot create a transportable snapshot;
       wherein the backup server is configured to cause the minimal set of snapshot providers to create a plurality of snapshots when the particular provider of the minimal set of snapshot providers can create a transportable snapshot, wherein each of the snapshots is a snapshot of a respective one of the plurality of volumes,
       wherein the backup server is configured to cause the plurality of snapshots to be transported to the media server via the network, and
       wherein the media server is configured to use the plurality of snapshots to backup the plurality of applications and to perform data mining of the plurality of snapshots for specific information.

3. An apparatus comprising:
   a backup engine, implemented by a computing device, for identifying a plurality of volumes, in response to receiving a request to backup a plurality of applications, wherein the identifying the plurality of volumes comprises identifying which volumes are used by the plurality of applications to be backed up, wherein the backup engine is further for identifying a minimal set of snapshot providers from a plurality of snapshot providers, wherein the identifying the minimal set comprises identifying which of the plurality of snapshot providers support the identified plurality of volumes, wherein the backup engine is further for identifying whether a particular snapshot provider of the minimal set of snapshot providers can create a transportable snapshot, wherein the backup engine is further for when the particular provider of the minimal set of snapshot providers cannot create a transportable snapshot, aborting the method, wherein the backup engine is further for when the particular provider of the minimal set of snapshot providers can create a transportable snapshot, causing the minimal set of snapshot providers to create a plurality of snapshots, wherein each of the snapshots is a snapshot of a respective one of the plurality of volumes; and wherein the backup engine is further for causing the plurality of snapshots to be transported to a media server; and a media server for performing the backup of the plurality of the applications using the plurality of snapshots and for data mining the plurality of snapshots for specific information.

4. The apparatus of claim 3 wherein the minimum set has a size of one.

5. The apparatus of claim 3 wherein the backup server collects metadata regarding the set of data volumes.

6. The apparatus of claim 5 wherein the metadata is sent from the backup agent to the backup engine and processed to determine a size of the minimal set of snapshot providers.

7. The apparatus of claim 6 wherein the metadata identifies the set of data volumes and the snapshot providers that are associated with the data volumes in the set of data volumes.

\* \* \* \* \*